United States Patent [19]
Mettler

[11] 4,392,750
[45] Jul. 12, 1983

[54] CLOCK WITH ROTATABLE RING

[75] Inventor: Eduard Mettler, Liestal, Switzerland
[73] Assignee: Revue Thommen AG, Switzerland

[21] Appl. No.: 228,390
[22] Filed: Jan. 26, 1981
[30] Foreign Application Priority Data
Apr. 23, 1980 [DE] Fed. Rep. of Germany ... 8011102[U]
[51] Int. Cl.[3] .......... G01D 11/28
[52] U.S. Cl. .......... 368/228; 368/67; 368/227
[58] Field of Search .......... 368/228, 67, 227, 185, 368/107, 110, 112, 113, 190, 224, 223, 233, 314, 316, 317, 34, 35, 37

[56] References Cited

U.S. PATENT DOCUMENTS 1,112,280 9/1914 Fitch .......... 368/316
1,160,110 11/1915 Mays .......... 368/228
3,377,795 4/1968 Rogers .......... 368/35
3,452,538 7/1969 Frey .......... 368/227

FOREIGN PATENT DOCUMENTS 288489 6/1953 Fed. Rep. of Germany .......... 368/288

*Primary Examiner*—J. V. Truhe
*Assistant Examiner*—Arthur G. Evans
*Attorney, Agent, or Firm*—McGlew and Tuttle

[57] ABSTRACT

A clock comprising, a case, a clockwork in the case having a plurality of pointers, a dial face in the case over which the pointers sweep about a common axis, a glass covering the dial and pointers, at least one illuminator for illuminating the dial and pointers and a ring having a face with spaced markings thereon which is mounted between the dial and glass and which can be manually rotated. The ring face is illuminated by the same illuminator which sheds light on the dial since the ring face faces the glass which receives light from the illuminator and illuminates both the dial and the ring face.

18 Claims, 5 Drawing Figures

CLOCK WITH ROTATABLE RING

FIELD AND BACKGROUND OF THE INVENTION

The present invention relates in general, to clocks and in particular to a new and useful clock which has a manually rotatable ring which is illuminated by the same illuminating device which illuminates the clock dial.

Dashboard clocks for airplanes are known, which comprises a case, a dial, pointers, a clock glass covering the dial and pointers, an electrical illumination device for the dial, and a rotatable graduated ring. This ring is provided at the outside of the case, so that the operator can turn it directly by hand. These prior art dashboard clocks have the disadvantage that in a dark ambiance, even with the dial illumination device turned on, the markings of the ring graduation re not or only poorly recognizable.

SUMMARY OF THE INVENTION

The present invention relates to a clock, particularly a dashboard clock for airplanes, equipped with a rotatable ring having at least one marking which is well illuminated even in a dark ambiance by an illumination device of the dial of the clock.

Accordingly, an object of the present invention is to provide a clock comprising, a case, a clockwork mounted in the case with at least one rotatable pointer, a dial face in the case over which the pointer sweeps about an axis, a glass connected to the case and covering the dial and at least one pointer, at least one illuminator in the case for illuminating the dial and at least one pointer, and a ring having a face with at least one marking thereon rotatably mounted about the axis of said at least one pointer between said dial face and said glass whereby light from said illuminator illuminating said dial face also illuminates said ring face.

A further object of the invention is to provide such a clock wherein the ring face is conically inclined toward said axis and away from said glass.

A further object of the invention is to provide such a clock wherein the illuminator is positioned at an edge of the glass which is roughened to illuminate opposite faces of said glass to shed light on said dial and ring faces.

Another object of the invention is to provide a clock with rotatable ring which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the following the invention is explained with reference to one embodiment shown in the drawings in which.

DESCRIPTION OF THE PREFERRED EMBODIMENT

Figure 1:
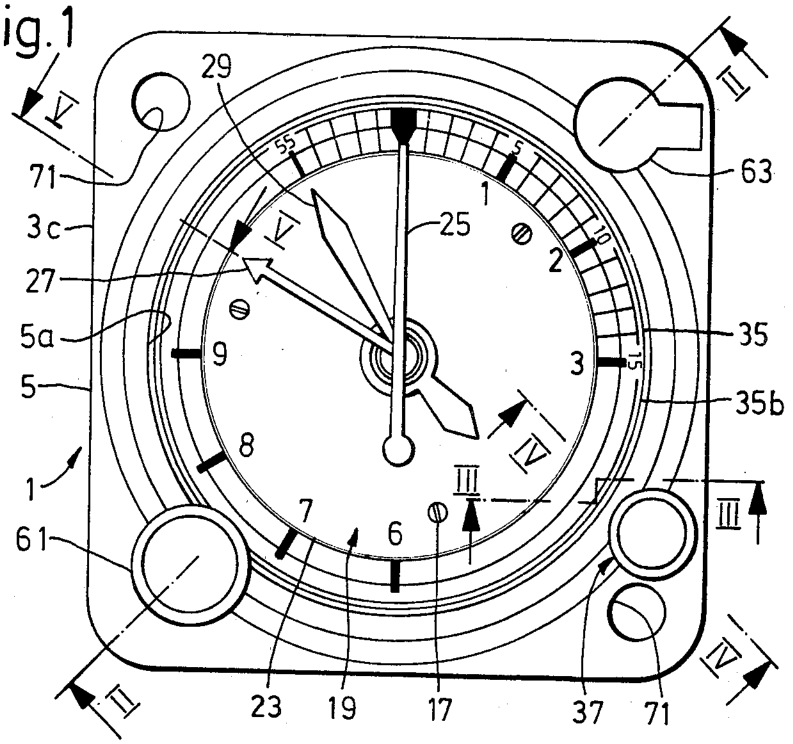
FIG. 1 is a front view of a clock, only a part of the numerals and the graduation on the dial and the graduated ring being shown.

Turning to the drawings in particular, the invention embodied therein, in FIG. 1, comprises a clock, particularly for mounting in an airplane dashboard, having a dial face 19 which is illuminated by an illuminator, the illuminator also illuminating a face of a rotatable ring 35 mounted for movement over the dial.

Figure 2:
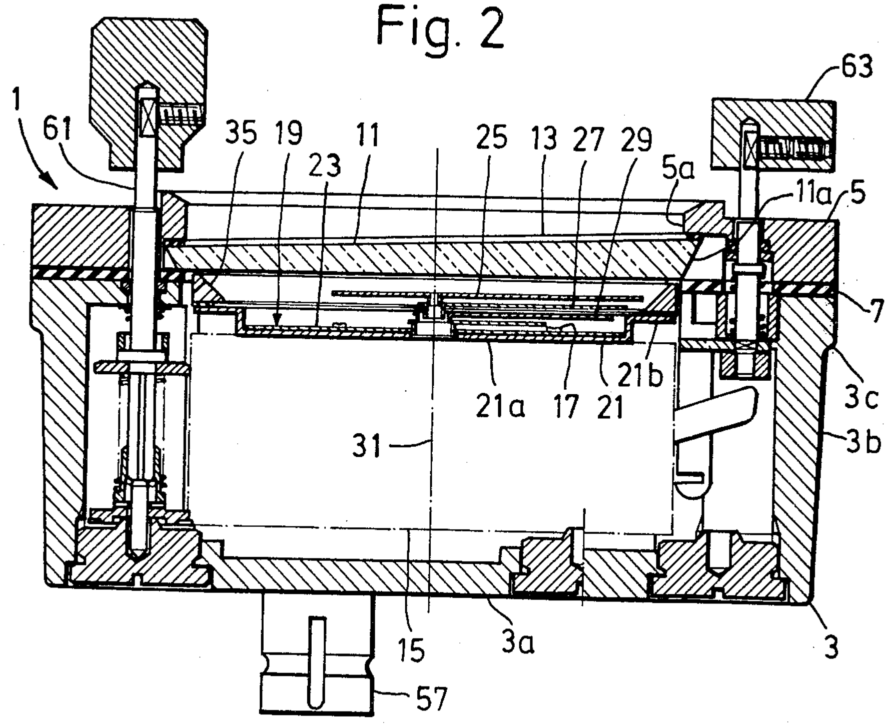
FIG. 2 is a sectional view taken along the line II—II of FIG. 1.
Figure 3:
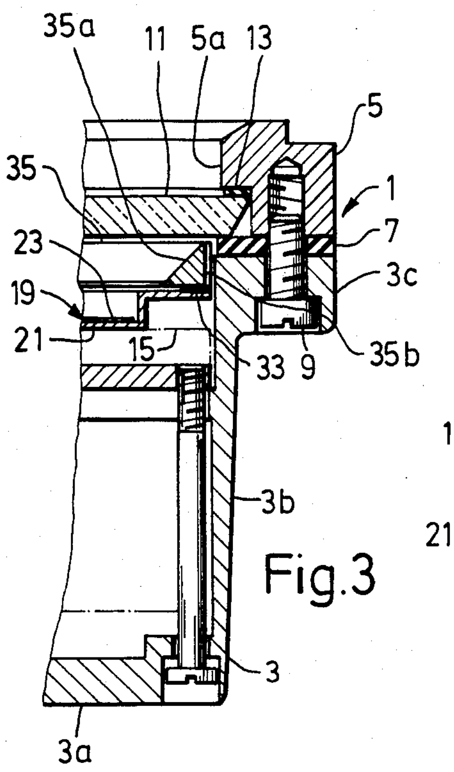
FIG. 3 is an enlarged sectional view taken along the line III—III of FIG. 1.

The clock in the somewhat simplified showing of FIGS. 1 and 2 is intended for mounting on the dashboard of an airplane. It comprises a case 1 with a bottom part 3 and an annular cover part 5. Bottom part 5 has a flat bottom *3a*, a substantially cylindrical wall *3b*, and a flange portion *3c* projecting outwardly from the upper end wall *3b* remote from the bottom and having an approximately square outline. In the same way as flange *3c*, cover part 5 has a substantially square outline and is tightly and detachably connected to bottom part 3 by means of screws 9, of which one is shown in FIG. 3, and a gasket 7. The central opening *5a* of annular cover part 5 is circular and in a shouldered portion of cover part 5 as seen in FIG. 2. A transparent plate made of mineral glass or a plastic, the so-called clock glass or crystal 11, is inserted in opening *5a* and held in place between gasket 7 and a seal 13 provided at one of the shoulders of opening *5a*. As may also be seen in FIG. 2, the thickness of clock glass 11 diminishes from one side to the other. The edge *11a* of clock glass 11 is inclined relative to the axis of rotational symmetry of opening *5a* and tapers conically in the direction of the interior of case 1.

The interior of case 1 accommodates the works 15 of the clock fixed therein and indicated as a block. On the side of works 15 facing clock glass 11, a dial 19 is secured comprising two parts, 21 and 23. The dial part 21 is dish-shaped and has a flat central portion *21a* followed by a short cylindrical wall portion. An annular and flat border portion *21b* of dial part 21 projects from the cylindrical wall portion outwardly and extends parallel to central portion *21a*, at a level offset relative thereto toward clock glass 11.

A second hand 25, a minute hand 27, and an hour hand 29 are mounted for rotation about an axis 31 which at the same time is the axis of symmetry of opening *5a* and the central axis of case 1. It will be understood that to make the showing of FIGS. 1 and 2 clear, the three hands are shown in different positions.

Face part 23 of dial 19 covers the area turned to clock glass 11 of central portion *21a* of dial part 21 and is provided with numerals indicating hours. The inner area of the side turned to glass 11 of border portion *21b* is provided with a minute graduation, i.e. 60 scale marks uniformly distributed over the circumference.

The outer area of the side turned to clock glass 11 of border portion *21b* carries a slide ring 33 of smooth plastic, which applies loosely or is fixed thereto. A graduated ring 35 is received with some play between slide ring 33 and clock glass 11. Laterally, graduated ring 35 is guided also with some play by case 1 or other members, so as to be rotatable about axis 31. The inside face 35*a* of graduated ring 35 tapers conically away from clock glass 11 and is provided with a graduation, namely 60 scale marks uniformly distributed over the circumference, and the respective numerals, 5,10,15 . . . 50,55. On its outside graduated ring 35 is provided with a gear rim 35*b*. The inclined ring face 35*a* is thus illuminated by light coming from an illuminated dial or dial face 19.

Figure 4:
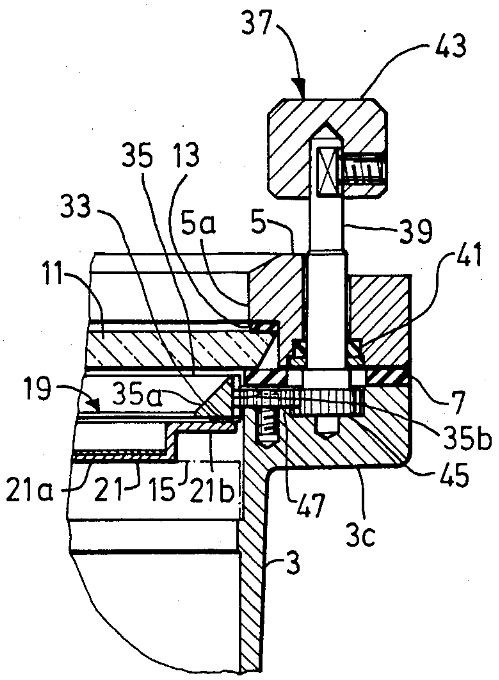
FIG. 4 is a similar view taken along the line IV—IV of FIG. 1.

A setting member 37 particularly shown in FIG. 4 comprises a shaft 39 which is mounted in flange 3*c* and cover part 5 for rotation about an axis parallel to axis 31, and extends through a hole in gasket 7, is sealed to the outside by an O-ring 41 and projects from cover part 5. A knob 43 is secured to the outer end of shaft 39. Close to its inner end, shaft 39 carries a gear rim 45 formed either by a gear firmly fitted to the shaft or integral therewith. A gear 47 is mounted for rotation in the case between graduated ring 35 and setting member 37 and meshes with the two gear rims 35*b* and 45. In consequence, if setting member 37 is manually turned about its axis, graduated ring 35 turns in the same direction.

Figure 5:
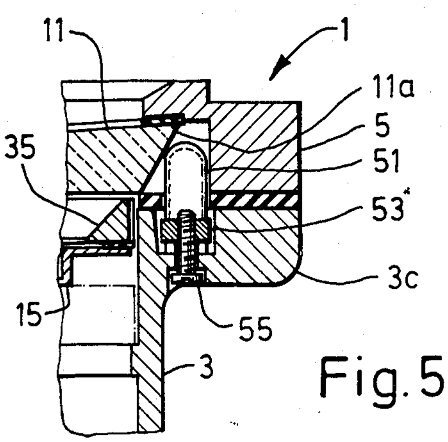
FIG. 5 is a similar view taken along the line V—V of FIG. 1.

The clock is equipped with at least one electrical source of light, for example with seven such devices of which one is indicated at 51 in FIG. 5. The source of light, embodied by an incandescent lamp or light emitting diode, are each secured to a socket 53 which in turn is firmly secured to flange 3*c* by means of screws 55. Light sources 51 are distributed over an arc extending for example, through 120° about axis 31 and clock glass 11, alongside the thickest portion of glass 11. Further, light sources 51 are mounted to have their most luminous portions positioned laterally of the conical edge 11*a* of clock glass 11. The leads of the light sources are connected by respective electrical conductors (not shown) to a plug connection 57 provided on the underside 3*a* of bottom part 3 of the case.

The face forming the conical edge 11*a* of clock glass 11 is relatively rough, so that the radiation of the light sources penetrating into the clock glass is diffusely refracted and scattered. The plane surfaces bounding the clock glass on the outside and the inside, on the contrary, are smooth and in addition finished for reducing the refractivity, for example, coated. This shape and properties of the clock glass surfaces have the affect that a large part of the light radiated by sources 51 into clock glass 11 emerges therefrom at the side facing the dial 19 and graduated ring 35, so that dial 19, hands 25, 27, 29 and the inside face 35*a* provided with markings of graduated ring 35 are satisfactorily and uniformly illuminated.

The clock is further equipped with a winding-up and hand-setting mechanism 61 comprising a shaft which is mounted for rotation in case 1, sealed toward the outside, and carries a knob on its end projecting from the case. Also provided is a stop mechanism generally designated 63. This mechanism comprises a bolt which is mounted in the case for rotation and axial displacement against the action of a spring, is sealed toward the outside, and carries a swivel arm on its end projecting from the case. Upon pushing the bolt by hand inwardly, a counting run can be started or stopped, with the measured time interval being indicated by the second hand 25 and by an additional minute hand (not shown) which is rotatable about an axis which is offset relative to axis 31. By turning this bolt, the time counter of the stop mechanism and the associated hands can be zeroed.

At diagonally opposite corners of flange 3*c* and cover part 5, case 1 is provided with two through-going screw holes 71, so that the clock may be screwed to a panel or the like of an airplane. Further, with a mounting in an airplane, the plug connection 57 serves as connection to a power source provided in the airplane for supplying current to illumination devices 51.

With the clock installed, the adjustable graduated ring may be used to preset a certain time period. For example, prior to the start of the airplane equipped with the clock, awaiting time up to the take-off may be set. Further, time periods may be present at the expiration of which the course is to be changed. To predetermine a time period, the graduated ring is set to indicate that the conditions for performing a provided operation are clear if a hand of the clock reaches a certain mark of the graduated ring.

With the light sources 51 in operation, the markings of the graduated ring are well visible even in a dark ambiance, so that the graduated ring is usable independently of the conditions of external illumination.

The clock may be modified in various ways. For example, the stop mechanism may be omitted. Further, instead of the purely mechanical works with a spring furnishing the drive energy, clock works with an electric drive motor may be provided.

In the described embodiment of the clock, a graduated ring is provided having 60 scale marks uniformly distributed over the circumference, and respective numerical indications. Instead of such a minute or second graduation, or in addition, one or more marks may be provided suitable to indicate the start and end of a time period.

While a specific embodiment of the invention has been shown and described in detail to illustrate the application of the principles of the invention, it will be understood that the invention may be embodied otherwise without departing from such principles.

What is claimed is:

1. A clock comprising, a case, a clockwork mounted in said case having at least one rotatable pointer, a dial face in the case over which said at least one pointer sweeps about an axis, a glass connected to said case and covering said dial face and at least one pointer, at least one illuminator in the case for illuminating the dial face and at least one pointer, and a ring with a face carrying at least one marking rotatably mounted about the axis of said at least one pointer under said glass, said ring face facing said glass to be illuminated by said illuminator along with said dial face and at least one pointer, said ring face being conically inclined toward the axis and away from said glass.

2. A clock comprising, a case, a clockwork mounted in said case having at least one rotatable pointer, a dial face in the case over which said at least one pointer sweeps about an axis, a glass connected to said case and covering said dial face and at least one pointer, at least one illuminator in the case for illuminating the dial face and at least one pointer, and a ring with a face carrying at least one marking rotatably mounted about the axis of said at least one pointer under said glass, said ring face facing said glass to be illuminated by said illuminator along with said dial face and at least one pointer, said glass having a conical edge with said at least one illuminator arranged laterally of said conical edge of said glass, said conical edge inclined toward the axis and toward said dial face.

3. A clock according to claim 1, wherein said glass has a roughened peripheral edge and flat surfaces, said illuminator positioned adjacent said peripheral edge to illuminate said surfaces to shed light on said dial face, at least one pointer and ring face.

4. A clock according to claim 1, including a dial carrying said dial face having an annular border portion, said ring rotatably mounted between said annular border portion of said dial and said glass.

5. A clock according to claim 4, wherein said dial border portion is offset toward said glass relative to a plane containing said dial face.

6. A clock according to claim 1, including setting means engaged with said ring for rotating said ring in said case.

7. A clock according to claim 6, wherein said setting means comprises a setting member rotatably mounted in said said case, a gear defined on a periphery of said ring and a gear connected to said setting member and meshed with said ring gear.

8. A clock according to claim 7, including one additional gear meshed between said ring gear and setting member gear so that manual rotation of said setting member rotates said ring in the same direction.

9. A clock according to claim 1, wherein said illuminator is provided at a lateral edge of said glass.

10. A clock according to claim 9, wherein said lateral edge of said glass is conically inclined toward said axis and toward an interior of said case.

11. A clock according to claim 7, including a sealing member around said setting member and a sealing ring between said case and a cover covering said case and supporting said glass, said sealing ring providing a space between said glass and said dial face for rotatably accommodating said ring.

12. A clock according to claim 1, wherein said case includes an outwardly projecting flange portion having at least one hole therethrough for mounting said clock.

13. A clock comprising, a case, a clockwork mounted in said case having at least one rotatable pointer, a dial face in the case over which said at least one pointer sweeps about an axis, a glass connected to said case and covering said dial face and at least one pointer, at least one illuminator in the case for illuminating the dial face and at least one pointer, a ring with a face carrying at least one marking rotatably mounted about the axis of said at least one pointer under said glass, said ring face facing said glass to be illuminated by said illuminator along with said dial face and at least one pointer, a setting member rotatably mounted in said case connected by gear means with said ring for rotating said ring in said case, and sealing means for sealing a space containing said ring and at least part of said gear means.

14. A clock according to claim 1, wherein the thickness of said glass diminishes from one side of said case to an opposite side thereof, said at least one illuminator arranged adjacent a thickest portion of said glass.

15. A clock according to claim 2, wherein the thickness of said glass diminishes from one side of said case to an opposite side thereof, said at least one illuminator arranged adjacent a thickest portion of said glass.

16. A clock according to claim 13, wherein the thickness of said glass diminishes from one side of said case to an opposite side thereof, said at least one illuminator arranged adjacent a thickest portion of said glass.

17. A clock according to claim 13, wherein said setting member is rotatable about an axis which is parallel to said axis of said at least one pointer.

18. A clock according to claim 13, wherein said gear means comprises a gear defined on a periphery of said ring and a gear connected to said setting member and meshed with said gear ring, said sealing means comprising a sealing member around said setting member and a sealing ring between said case and a cover covering said case and supporting said glass, said sealing ring providing a space between said glass and said dial face for rotatably accommodating said ring.

* * * * *